(12) United States Patent
Haugeberg (10) Patent No.: US 8,117,946 B2
(45) Date of Patent: Feb. 21, 2012

(54) LOCKING DIFFERENTIAL WITH SHEAR PIN/SPRING ASSEMBLY

(75) Inventor: Bryan Haugeberg, Snohomish, WA (US)

(73) Assignee: Ring and Pinion Service, Inc., Everett, WA (US)

( * ) Notice: Subject to any disclaimer, the term of this patent is extended or adjusted under 35 U.S.C. 154(b) by 675 days.

(21) Appl. No.: 12/262,956

(22) Filed: Oct. 31, 2008

(65) Prior Publication Data

US 2010/0113208 A1 May 6, 2010

(51) Int. Cl.
*F16H 48/12* (2012.01)

(52) U.S. Cl. .......................................... 74/650; 475/240

(58) Field of Classification Search .................. 29/893.1, 29/893.2; 192/48.8, 48.9, 69.83, 89.26; 464/33, 464/38; 475/231, 234, 235, 240, 241; 74/650
See application file for complete search history.

(56) References Cited

U.S. PATENT DOCUMENTS

| | | | |
|---|---|---|---|
| 3,498,154 A | 3/1970 | Muller-Berner | |
| 3,666,257 A | 5/1972 | Sorteberg | |
| 3,732,752 A | 5/1973 | Louckes et al. | |
| 3,913,414 A | 10/1975 | Freiburger | |
| 4,043,224 A | 8/1977 | Quick | |
| 4,186,625 A | 2/1980 | Chamberlain | |
| 4,400,996 A | 8/1983 | Schou | |
| 4,424,725 A | 1/1984 | Bawks | |
| 4,555,962 A | 12/1985 | Bucarelli | |
| 4,557,158 A | 12/1985 | Dissett et al. | |
| 4,594,913 A | 6/1986 | Opitz | |
| 4,644,818 A | 2/1987 | Choma et al. | |
| 4,644,823 A | 2/1987 | Mueller | |
| 4,665,769 A | 5/1987 | Parsons | |
| 4,745,818 A | 5/1988 | Edwards et al. | |
| 4,759,232 A | 7/1988 | Roberts | |
| 4,791,832 A | 12/1988 | McCaw | |
| 4,901,599 A | 2/1990 | Irwin | |
| 4,955,853 A | 9/1990 | Bausch | |
| 4,959,043 A | 9/1990 | Klotz et al. | |
| 4,976,667 A | 12/1990 | Goscenski, Jr. | |
| 5,045,038 A | 9/1991 | Sherlock | |
| 5,171,192 A | 12/1992 | Schlosser et al. | |
| 5,176,590 A | 1/1993 | Haydock | |
| 5,350,340 A | 9/1994 | Paul et al. | |
| 5,413,015 A * | 5/1995 | Zentmyer | ........................ 74/650 |
| 5,524,509 A | 6/1996 | Dissett | |

(Continued)

FOREIGN PATENT DOCUMENTS

EP 0198143 10/1986

(Continued)

*Primary Examiner* — Roger Pang
*Assistant Examiner* — Huan Le
(74) *Attorney, Agent, or Firm* — Lowe Graham Jones PLLC (57) ABSTRACT

A clutch assembly for a locking differential includes driving clutch members engaged with driven clutch members in a preloaded configuration to provide a minimum amount of preload there between during low torque conditions. The driving clutch members are biased relative to each other with shear pin/spring assemblies located within bores of the driving clutch members. During assembly of the clutch assembly, the shear pin/spring assemblies may be positively locked down within the bores with a removable tool. In one embodiment, the removable tool is inserted into a small opening extending through the driving clutch member and the tool engages an annular groove on a shear pin of the shear pin/ spring assembly. Further, the clutch assembly may include driving clutch members having drainage openings that may help prevent hydraulic lock during operation of the locking differential.

18 Claims, 8 Drawing Sheets

U.S. PATENT DOCUMENTS

| | | | |
|---|---|---|---|
| 5,590,572 A | 1/1997 | Valente | |
| 5,591,098 A | 1/1997 | Jones et al. | |
| 5,715,733 A | 2/1998 | Dissett | |
| 5,749,803 A | 5/1998 | Teraoka et al. | |
| 5,836,220 A * | 11/1998 | Valente | 74/650 |
| 5,947,859 A | 9/1999 | McNamara | |
| 6,309,321 B1 | 10/2001 | Valente | |
| 6,394,927 B1 | 5/2002 | Bongard | |
| 6,432,020 B1 | 8/2002 | Rivera et al. | |
| 7,056,256 B2 | 6/2006 | Asahi | |
| 7,824,296 B2 | 11/2010 | Lyman | |
| 2002/0151402 A1 * | 10/2002 | Zentmyer | 475/231 |
| 2004/0198546 A1 | 10/2004 | Okazaki | |
| 2006/0046890 A1 | 3/2006 | Aikawa | |
| 2008/0176703 A1 * | 7/2008 | Hoberg | 475/235 |
| 2009/0011890 A1 * | 1/2009 | Bawks | 475/231 |

FOREIGN PATENT DOCUMENTS

| | | |
|---|---|---|
| GB | 2374858 | 10/2002 |

* cited by examiner

LOCKING DIFFERENTIAL WITH SHEAR PIN/SPRING ASSEMBLY

FIELD OF THE INVENTION

This invention relates generally to a locking differential system having a lockable shear pin/spring assembly, and more specifically to a shear pin/spring assembly that may be positively locked during assembly using a suitable tool.

BACKGROUND OF THE INVENTION

Differentials for automotive-type applications are used in many front or rear axles to transmit the power from the engine to the driven wheels of the vehicle. Conventional differentials permits a vehicle to turn corners with one wheel rolling faster than the other and generally include two side gears coupled to the output or driven shafts, which in turn are coupled to the respective left and right wheels of the vehicle. The differential case generally includes a ring gear driven by a pinion gear coupled to an end of the vehicle drive shaft driven by the engine. Side gears are located within and coupled to the differential case while typically being splined or otherwise coupled to the respective driven shafts. The side gears may be controlled by various means to permit the driven shafts to power both wheels during most vehicle maneuvers. But when turning, this arrangement of the differential permits the outer wheel to overrun (i.e., rotate faster than) the inner wheel, which lags (i.e., rotates slower). The amount of overrun rate is generally equivalent to the amount of lag.

There are a variety of differential types such as conventional or "open" differentials, limited slip differentials, and lockable or locking differentials. These types are distinguishable by how they handle various possible operating conditions.

Locking differentials contain mechanisms and features which cause the differential to prevent or limit rotational speed differences between the left and right driven wheels. Different methodologies are used to actuate these mechanisms. The most common means for actuation of the mechanism in a locking differential are pneumatic, hydraulic, electric, electromechanical, mechanical friction or some combination thereof.

Several conventional locking differentials are described in U.S. Pat. No. 5,413,015 (Zentmyer), U.S. Pat. No. 5,715,733 (Dissett) and U.S. Pat. No. 5,836,220 (Valente). Each of these conventional locking differentials attempts to provide a minimum amount of preload on a pair of driving clutch members such that the driving clutch members remain engaged with driven clutch members during low torque conditions (e.g., when the vehicle tires may be prone to easily rotate such as when the vehicle is on ice). For clarification herein, the terms "driving" and "driven" are intended to indicate separate clutch members. The driving clutch members are mechanically engaged to a drive shaft which is rotated by operation of an engine. The driving clutch members engage the driven clutch members through complimentary teeth. The driven clutch members, in turn, are respectively coupled to output shafts that drive the wheels of the vehicle.

Under low torque conditions, the minimum amount of preload establishing the engagement between the driving and driven clutch members is generated by a shear pin and spring assembly located in corresponding bores of the driving clutch members. Some embodiments may include a disk or spring cap positioned between the spring and the end surface of the shear pin while another embodiment employs concentric springs that engage the end surface of the shear pin. Nevertheless, the assembly process of inserting the shear pin and spring assemblies into the bores of the driving clutch members and establishing the minimum amount of preload has a number of drawbacks. By way of example, holding the shear pins and springs in the bores of one driving clutch member while attempting to engage the corresponding driving clutch member may result in one or more of the shear pins and/or springs falling out of its respective bore. In some cases a tool is used to move the shear pin and compress the spring, which then permits an E-clip or a C-clip to be placed over a groove in the shear pin and thus capture the shear pin in its bore. In other cases, the springs are inserted into openings formed in the driving clutch members.

SUMMARY OF THE INVENTION

The present invention is generally related to a clutch assembly for a locking differential. The clutch assembly includes driving clutch members engaged with driven clutch members in a preloaded configuration to provide a minimum amount of preload there between during low torque conditions. The driving clutch members are biased relative to each other with shear pin/spring assemblies located within bores of the driving clutch members. During assembly of the clutch assembly, the shear pin/spring assemblies may be positively locked down within the bores with a removable tool. In one embodiment, the removable tool is inserted into a small opening extending through the driving clutch member and the tool engages an annular groove on a shear pin of the shear pin/spring assembly. Further, the clutch assembly may include driving clutch members having drainage openings that may help prevent hydraulic lock during operation or assembly of the locking differential.

In one example, a clutch assembly for a differential system includes a cross pin, a pair of driven clutch members, and a pair of driving clutch members in toothed engagement with the pair of driven clutch members. The cross pin is located between the driving clutch members and each driving clutch member includes at least one bore. A shear pin assembly is sized to be received in the at least one bore. The shear pin assembly includes a shear pin with a hollow shear pin body and an end surface. The shear pin assembly further includes a spring received within the hollow shear pin body, wherein the end surface of the shear pin body contacts the at least one driving clutch member and an end surface of the spring contacts the other driving clutch member to maintain the driving clutch members in a preloaded configuration based on a desired amount of spring compression force.

In another example, a clutch system for a differential system includes a cross pin, a pair of driven clutch members, and a pair of driving clutch members in toothed engagement with the pair of driven clutch members. The cross pin is located between the driving clutch members and each driving clutch member includes at least one bore. A shear pin is received in the at least one bore and includes an annular groove extending around an outer surface of the shear pin. The annular groove is alignable with an opening extending radially through at least one of the driving clutch members.

In yet another example, a method of assembling a clutch assembly for a differential system includes the steps of (1) urging a shear pin into a bore of a driving clutch member with a desired amount of pressure; (2) compressing a spring located within a body of the shear pin, the spring being compressed between an end portion of the shear pin and the bore of the driving clutch member; (3) aligning an annular groove of the shear pin with an opening that extends from an outer surface of the driving clutch member into the bore that receives the shear pin; and (4) inserting a tool into the opening to engage the annular groove and thus secure the shear pin within the bore.

BRIEF DESCRIPTION OF THE DRAWINGS

The sizes and relative positions of elements in the drawings or images may not necessarily be to scale. For example, some elements may be arbitrarily enlarged or otherwise modified to improve clarity. Further, the illustrated shapes of the elements may not convey their actual shapes, and have been solely selected for ease of recognition. Various embodiments are briefly described with reference to the following drawings.

DETAILED DESCRIPTION OF THE INVENTION

In the following description, certain specific details are set forth in order to provide a thorough understanding of various embodiments of the invention. However, one skilled in the art will understand that the invention may be practiced without these details or with various combinations of these details. In other instances, well-known structures and methods associated with differential systems, driving and output mechanisms for the differential systems, clutch assemblies for differential systems, and sub-assemblies located within a housing or case of the differential system, and methods of assembling, operating and using the same may not be shown or described in detail to avoid unnecessarily obscuring descriptions of the embodiments of the invention.

Figure 1:
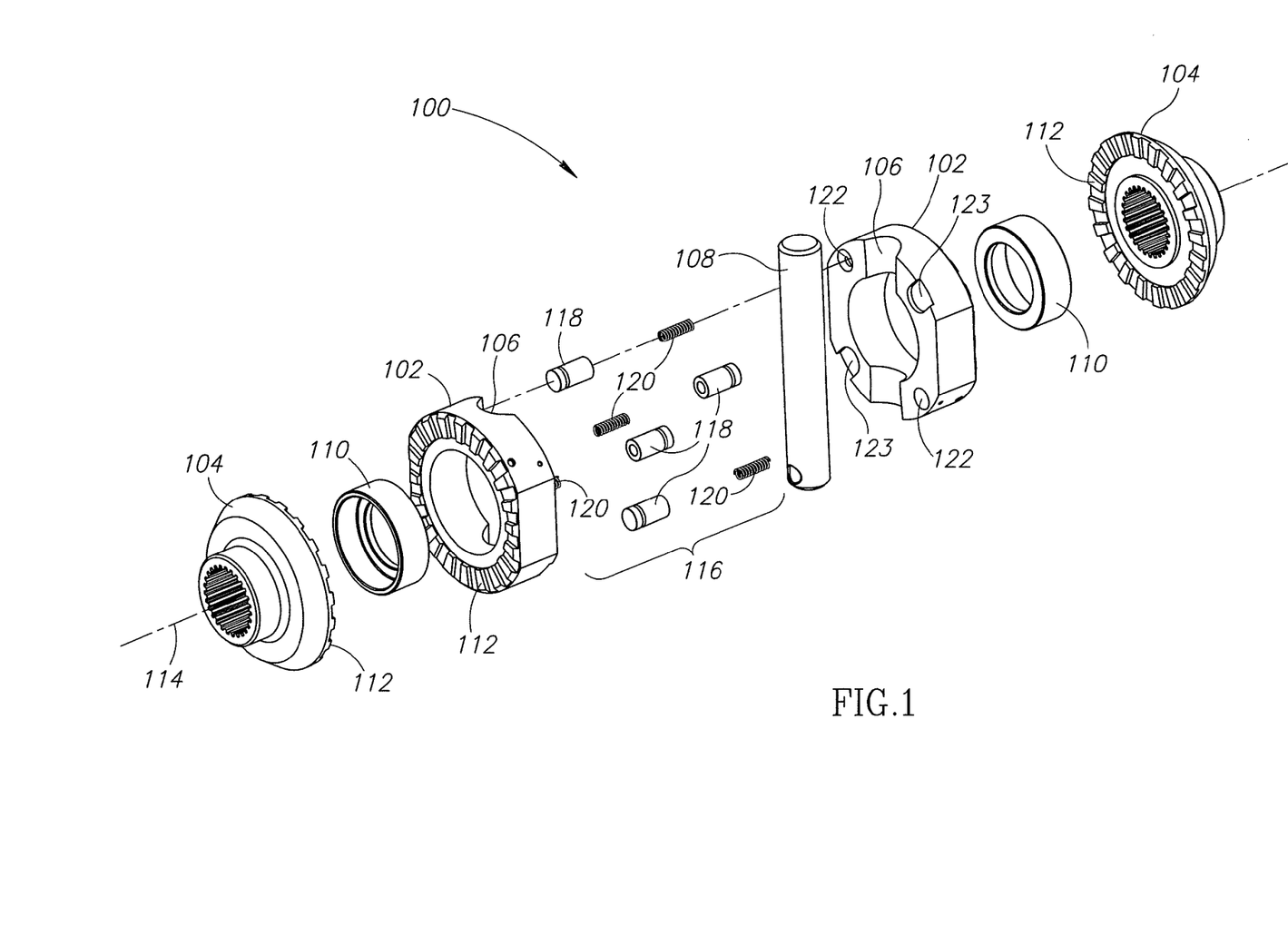
FIG. 1 is an isometric exploded view of a clutch assembly for a differential system having driving clutch members engaged with driven clutch members in a preloaded configuration by operation of a number of shear pin/spring assemblies according to an illustrated embodiment of the invention.

FIG. 1 shows an embodiment of the present invention that takes the form of a clutch assembly 100 for a locking differential having driving clutch members 102, which may otherwise be referred to as drivers, engaged with driven clutch members 104, which may be otherwise referred to as couplers. The driving clutch members 102 include grooves 106 to receive a cross pin 108. A spacer 110 is positioned between the cross pin 108 and the corresponding driven clutch members 104. The driving clutch members 102 engage the driven clutch members 104 through a plurality of teeth 112 that extend substantially parallel to a rotational axis 114.

A plurality of shear pin/spring assemblies 116 operate to maintain the driving clutch members 102 in a preloaded configuration during low torque conditions, which may generally be any condition where vehicle traction is reduced from a traditional tire-to-road contact, such as, but not limited to, icy or cold conditions, muddy condition, wet or slippery conditions, oily conditions, etc. The shear pin/spring assemblies 116 include shear pins 118 and springs 120, which may take the form of compression springs. The preload configuration provides a minimum amount of preload that must be overcome before the driving clutch members 102 become disengaged from the driven clutch members 104 to allow the driven clutch members 104 to enter an overrun condition. The minimum amount of preload is achieved by a cumulative spring force for the number of shear pin/spring assemblies 116 in the clutch assembly 100. For explanatory purposes and not intended to limit the scope of the invention, the illustrated embodiment shows four shear pin/spring assemblies 116, such that if each spring 120 had a linear spring rate of 10 pounds per inch (lbs/in) then the cumulative spring rate would be 40 lbs/in for the clutch assembly 100. The shear pin/spring assemblies 116 are received in bores 122 in each of the driving clutch members 102.

Figure 2:
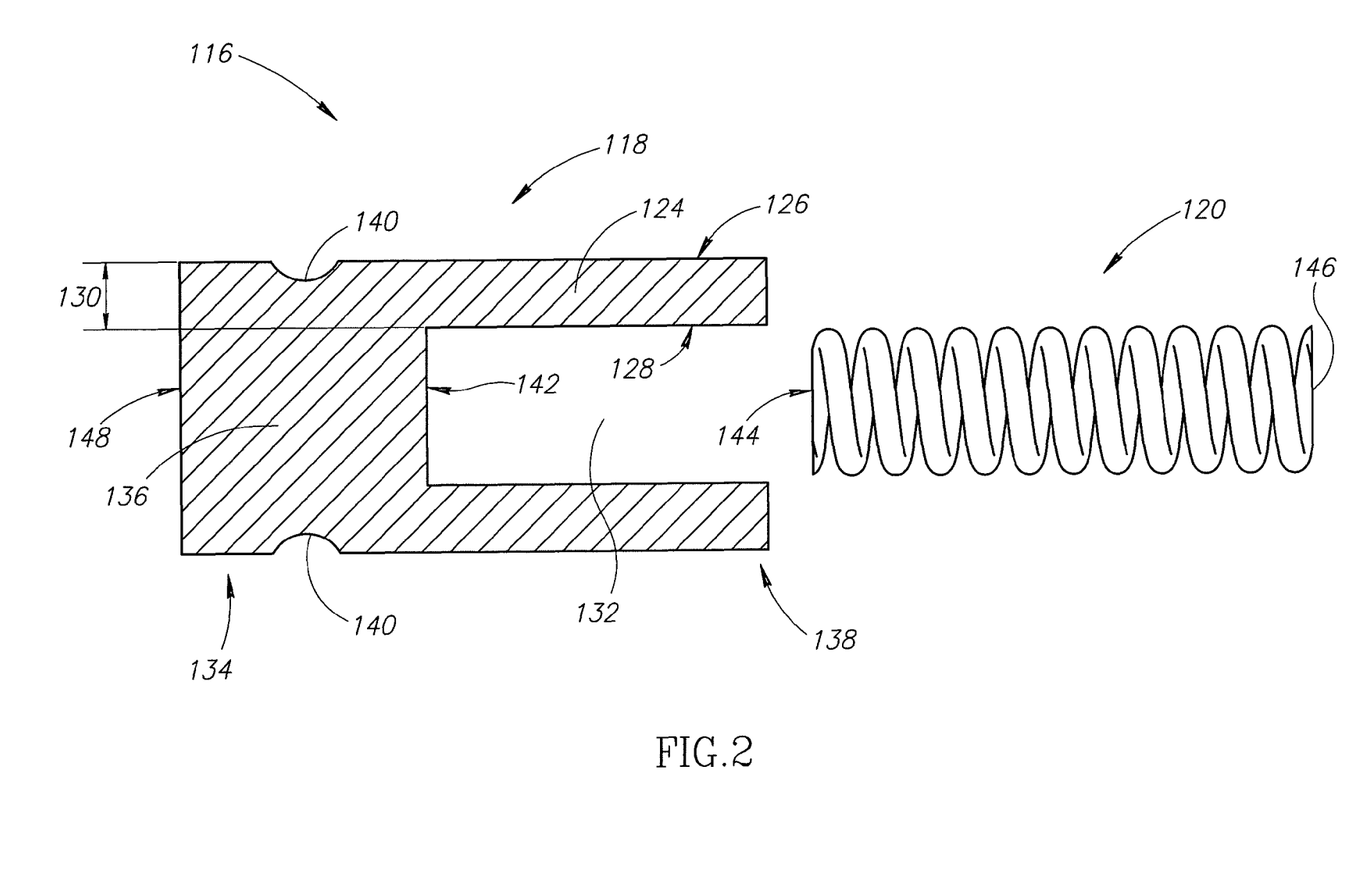
FIG. 2 is a cross-sectional exploded view of one of the shear pin/spring assemblies according to an illustrated embodiment of the invention.

FIG. 2 shows the shear pin/spring assembly 116 in which the shear pin 118 includes a body 124 having an outer perimeter 126 disposed from an inner perimeter 128 by a wall thickness 130 and where the inner perimeter defines a passageway 132. An end portion 134 closes off a first end 136 of the body 124 while a distal end 138 remains open to receive the spring 120. Thus in the illustrated embodiment, the body 124 takes the form of a hollow cylinder with one end closed off by the end portion 134. In addition, the shear pin 118 includes an annular groove 140 recessed partially into the wall thickness 130 of the body 124. The end portion 134 includes a contact surface 142 for contacting a first end 144 of the spring 120. Once the shear pin/spring assembly 116 is installed into the driving clutch members 102 (FIG. 1), a second end 146 of the spring 120 contacts the counterbored surface in the bore 122 (FIG. 1) of one driving clutch member 102 (FIG. 1) while an end surface 148 of the shear pin 118 contacts a rotation limiting slot surface 123 (FIG. 1) of the other driving member 102 (FIG. 1). Because the spring 120 is installed in under compression, the spring force of the spring 120 biases and maintains the driving clutch members 102 (FIG. 1) in the preloaded configuration unless the driving clutch members 102 are intentionally disengaged from the driven clutch members 104 (FIG. 1) to create an overrun condition.

Figure 3:
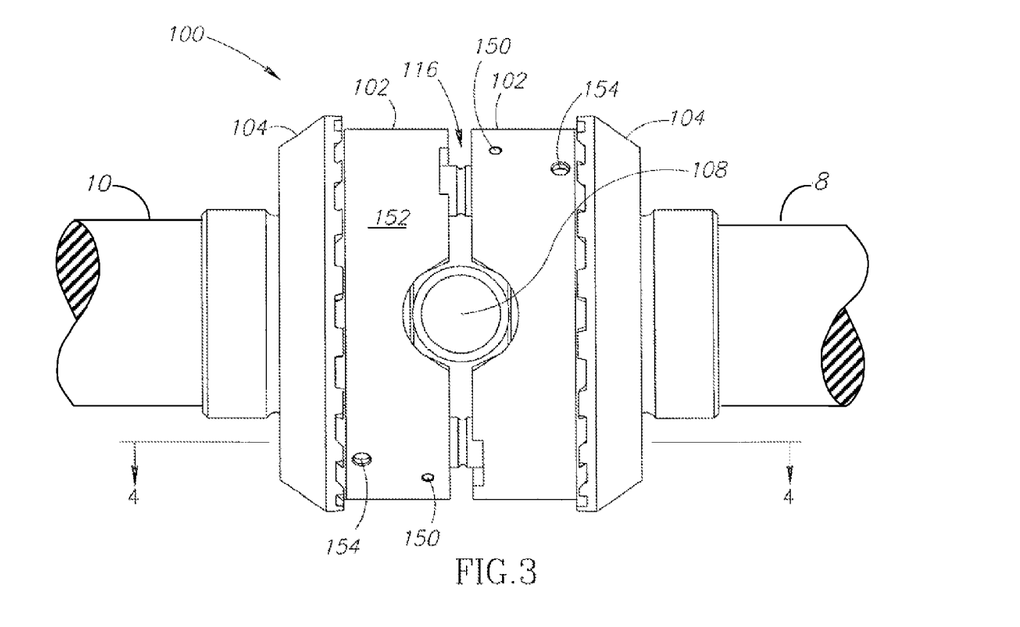
FIG. 3 is a top plan view of the clutch assembly of FIG. 1 showing the driving clutch members engaged with driven clutch members in a preloaded configuration.
Figure 4:
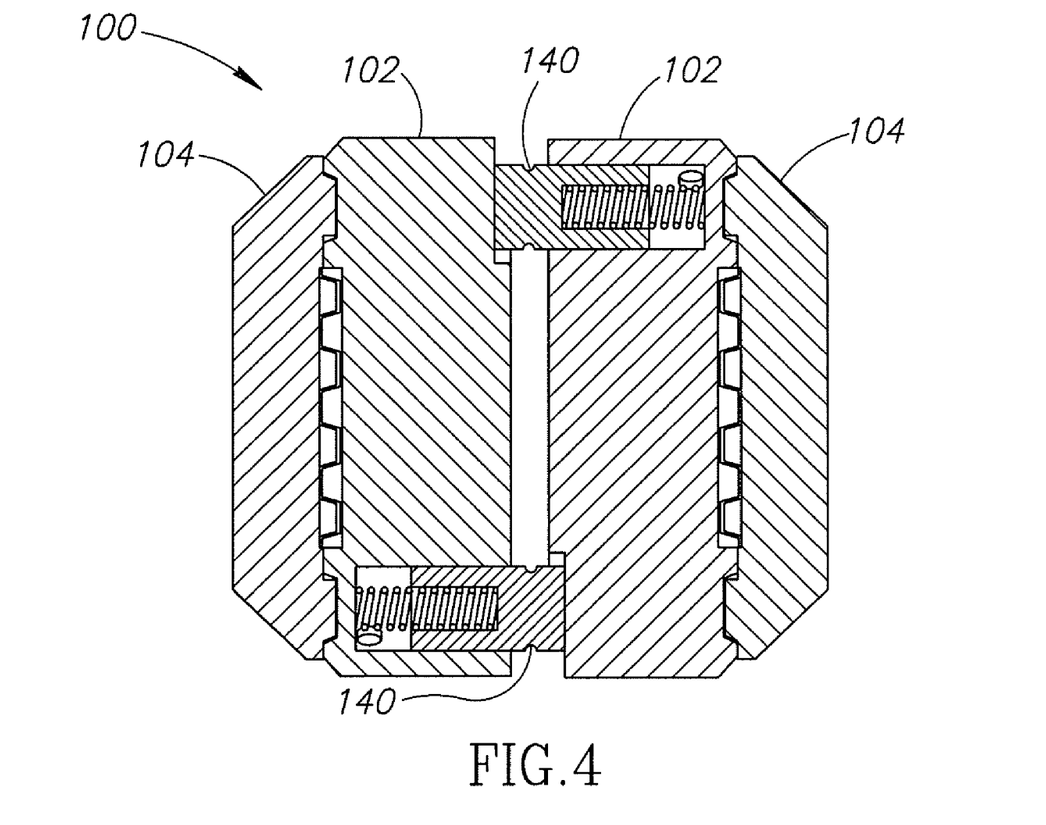
FIG. 4 is a cross-sectional view of the clutch assembly of FIG. 3 taken along line 4-4 of FIG. 3.

FIGS. 3 and 4 show the clutch assembly 100 having the driving clutch members 102 engaged with the driven clutch members 104 and maintained in the preloaded configuration by the shear pin/spring assemblies 116. Shafts 8, 10 are mounted on the driven clutch members 104, shown in partial cutaway. At least one of the driving clutch members 102 includes first openings 150 extending from an outer surface 152 of the driving clutch member 102 into the bores 122 that receive the shear pin 118 of the shear pin/spring assemblies 116. In addition, at least one of the driving clutch members 102 includes second openings 154 that may also extend from the outer surface 152 into the bores 122.

Figure 5:
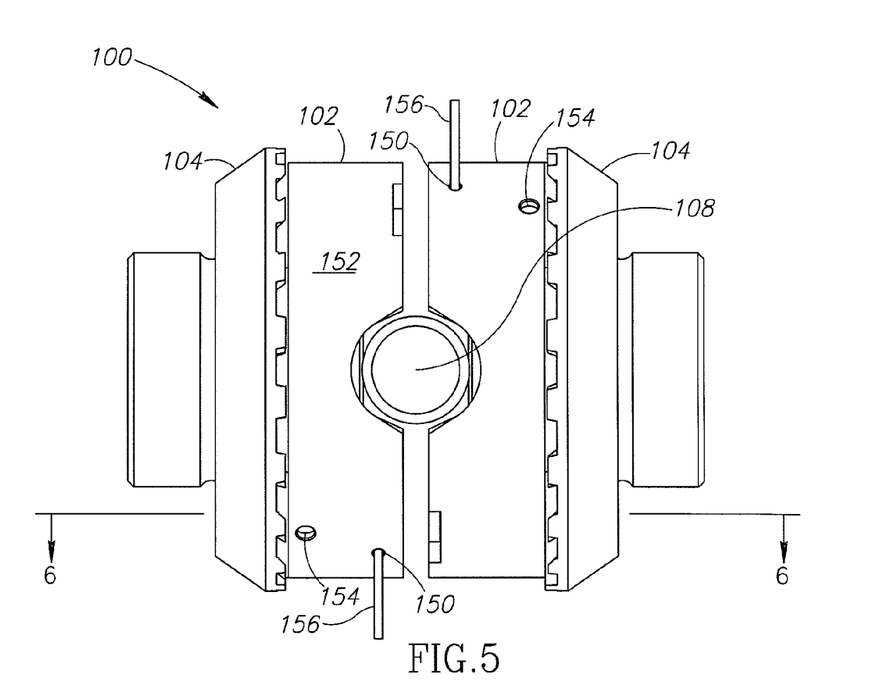
FIG. 5 is a top plan view of the clutch assembly of FIG. 1 showing the driving clutch members, the driven clutch members and the shear pin/spring assemblies arranged in an assembly configuration with the shear pins retracted.

In one embodiment, the first openings 150 provide access for a tool that may be used to positively lock the shear pin/spring assemblies 116 in a retracted position during assembly of the clutch assembly 100. The retracted position of the shear pin/spring assemblies 116 is best shown in FIG. 5. During assembly of the clutch assembly 100, the shear pin/spring assemblies 116 are urged into the bore 122, generally merely hand or finger pressure, and then each annular groove 140 of each shear pin 118 is aligned with its respective opening 150. Once aligned, a tool 156 (FIGS. 5 and 6) is placed into each opening 150 and slid into each annular groove 140 such that each shear pin 118 is restrained from moving axially along axis 114 (FIG. 2) within the driving clutch member 102. The tool 156 may take the form of a sufficiently stiff piece of wire, a small diameter elongated rod, a pin or an equivalent detent mechanism sized to fit into the opening 150. Once the shear pin/spring assemblies 116 are locked in situ with respect to the driving clutch member 102, the other components of the clutch assembly 100 may be assembled together with little to no risk that the shear pin/spring assemblies 116 may be dislodged from the bores 122. After the clutch assembly 100 is fully assembled, the tools 156 (FIGS. 5 and 6) in each of the first opening 150 may be removed, which in turn permits the shear pin/spring assemblies 116 to place the driving clutch members 102 into the preloaded configuration with respect to the driven clutch members 104.

Figure 6:
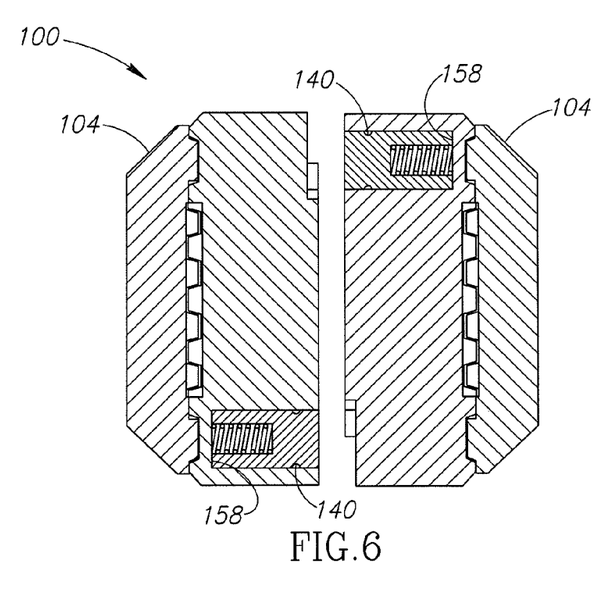
FIG. 6 is a cross-sectional view of the clutch assembly of FIG. 5 taken along line 6-6 of FIG. 5.

Briefly referring to FIGS. 5 and 6, the shear pin 118, when held in place with the tool 156, compresses the spring 120 between the surface 142 (FIG. 2) of the shear pin body 124 (FIG. 2) and a corresponding surface 158 of the driving clutch member 102.

Referring back to FIG. 3, the second openings 154 are configured to allow oil or other fluids to drain from the bores 122 (FIG. 2) in the driving clutch members 102. Thus the second openings 154, which may be referred to as drainage holes 154, may prevent hydraulic locking of the shear pin/spring assemblies 116 due to fluid build-up within the bores 122. In the illustrated embodiment, the first opening 150 is circumferentially offset from the second opening 154.

Figure 7:
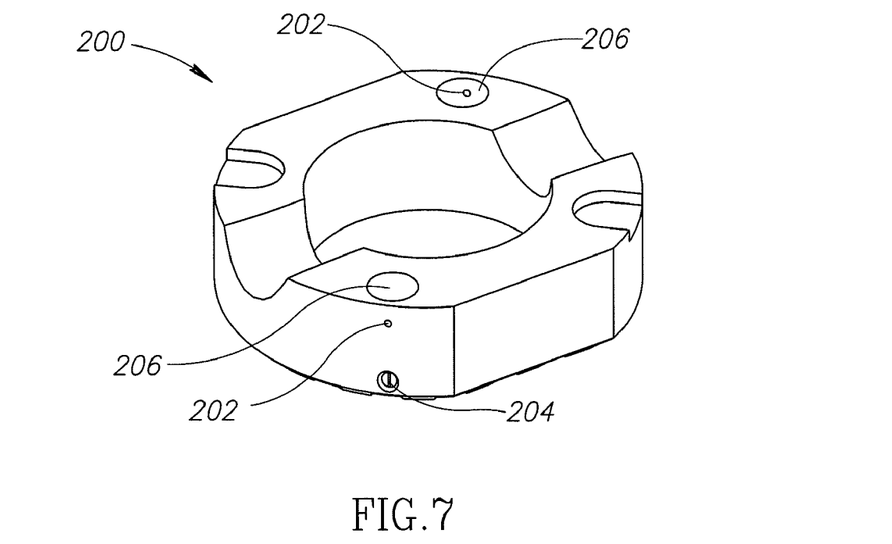
FIG. 7 is an isometric view of a driving clutch member having aligned tooling and drainage openings according to an illustrated embodiment of the invention.
Figure 8:
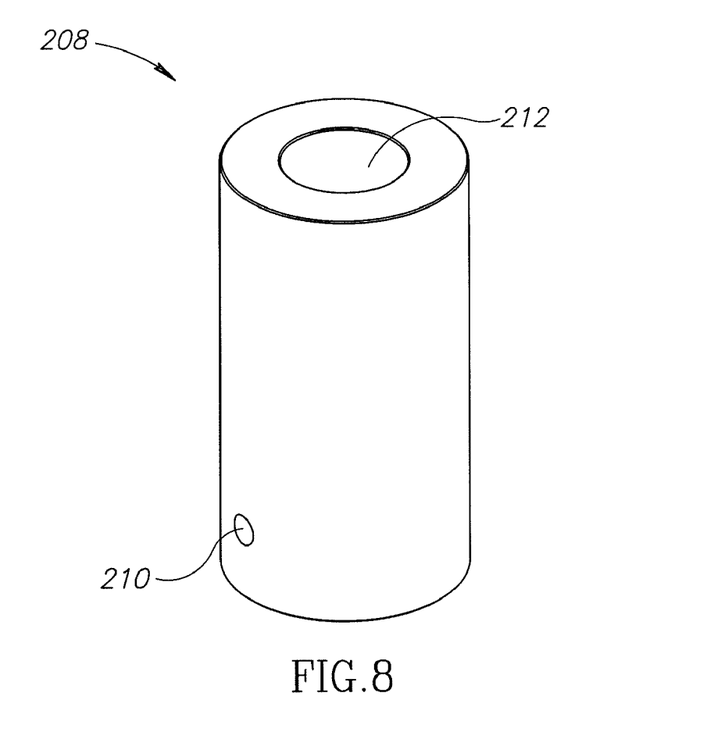
FIG. 8 is an isometric view of a shear pin having a tooling opening according to an illustrated embodiment of the invention.

FIG. 7 shows a clutch member 200 having a first opening 202 and a second opening 204. Each opening 202, 204 is aligned substantially perpendicular with respect to a bore 206 machined through the clutch member 200 for holding the shear pin/spring assembly (not shown). FIG. 8 shows a shear pin 208 that may be received in the bore 206. The shear pin 208 includes a tool opening 210 that is substantially perpendicular to a spring receiving bore 212. The shear pin 208 may be secured within the clutch member 200 by aligning the tool opening 210 in the shear pin with the first opening 202 in the clutch member and then inserting a tool, such as an elongated piece of wire into both openings 210, 202.

Figure 9:
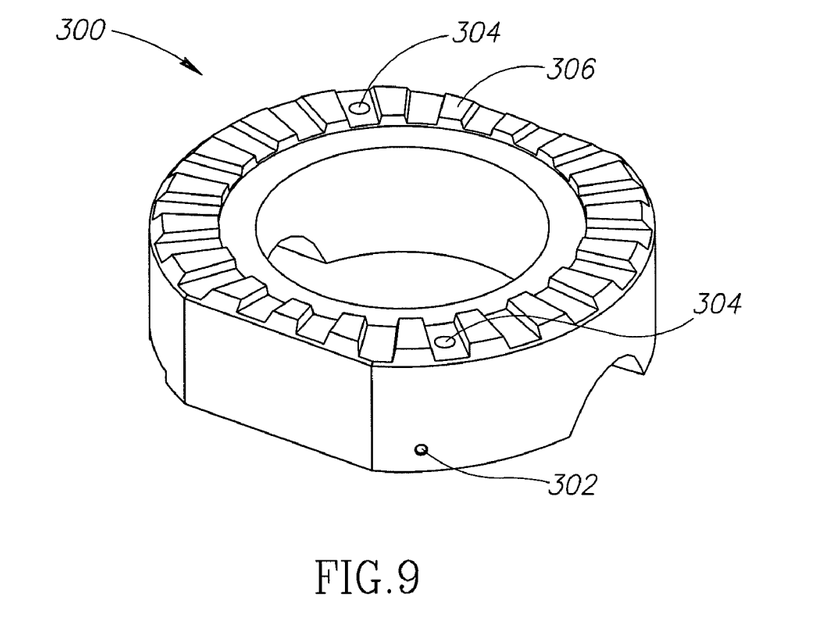
FIG. 9 is an isometric view of a driving clutch member having a drainage opening extending through a body of the clutch member according to an illustrated embodiment of the invention.

FIG. 9 shows a clutch member 300 having a first opening 302 for receiving a tool (not shown) to secure a shear pin/spring assembly (not shown). The clutch member 300 further includes a drainage opening 304 extending through the clutch member 300 substantially parallel to the rotational axis 114 (FIG. 1). The drainage opening 304 permits fluid that accumulates within the bores 122 and around teeth 306 to drain between the teeth 306.

Figure 10:
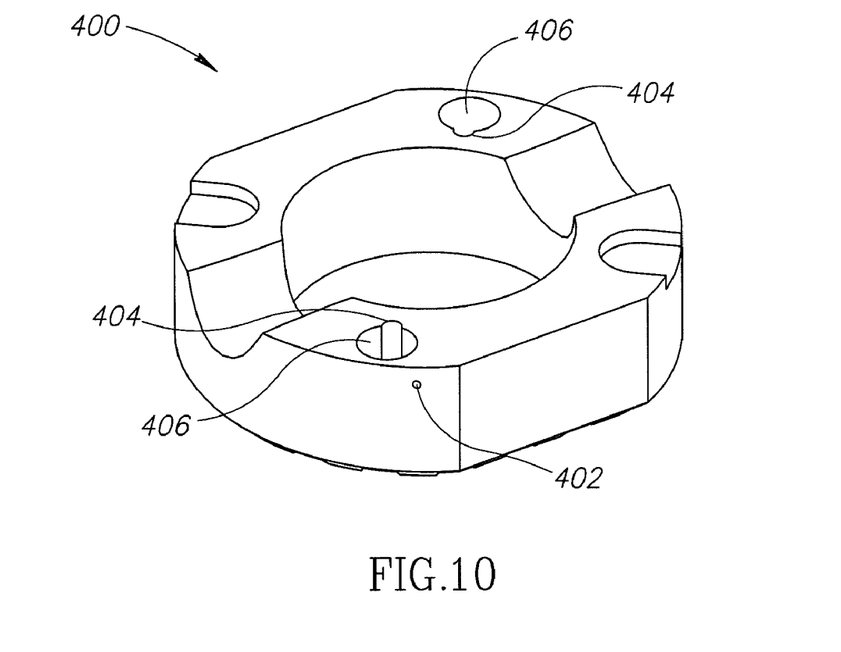
FIG. 10 is an isometric view of a driving clutch member having a drainage opening located adjacent to an opening for receiving a shear pin/spring assembly according to an illustrated embodiment of the invention.

FIG. 10 shows another clutch member 400 having a first opening 402 for receiving a tool (not shown) to secure a shear pin/spring assembly (not shown). In the illustrated embodiment, a passageway 404 is machined parallel to a bore 406 that receives the shear pin/spring assembly. The passageway 404 permits fluid that may accumulate in the bore 406 to drain and thus reduce the likelihood that the shear pin/spring assembly may experience a hydraulic lock situation, which may be most likely to occur during a subsequent cold start when the fluid trapped in the bore 406 becomes cooled and more viscous.

Figure 11:
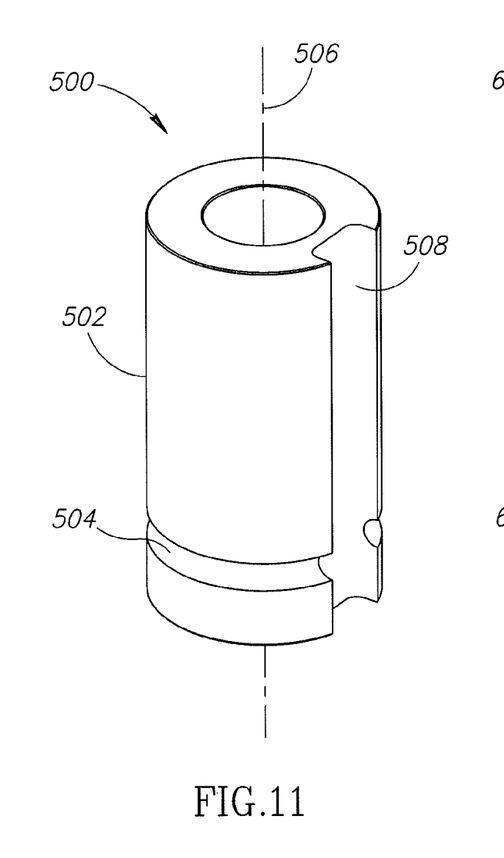
FIG. 11 is an isometric view of a shear pin having a recessed channel according to an illustrated embodiment of the invention.

FIG. 11 shows a shear pin 500 having a shear pin body 502 with an annular groove 504. Aligned along a major axis 506 of the shear pin body 502 is a recessed slot or channel 508 to prevent fluid from accumulating around the shear pin body 502 and to provide a fluid drainage path. In short, the channel 508 reduces the likelihood that the shear pin/spring assembly may experience a hydraulic lock situation.

Figure 12:
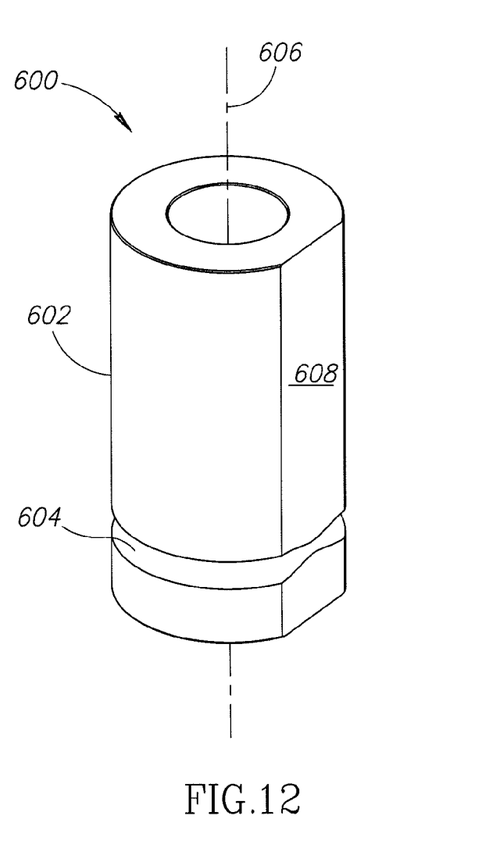
FIG. 12 is an isometric view of a shear pin having a machined flat surface according to an illustrated embodiment of the invention.

FIG. 12 shows another shear pin 600 having a shear pin body 602 with an annular groove 604. Aligned along a major axis 606 of the shear pin body 602 is a flat 608 that cooperates with the circular bore in the clutch member to prevent fluid from accumulating around the shear pin body 602 and to provide a fluid drainage path. In short, the flat 608 reduces the likelihood that the shear pin/spring assembly may experience a hydraulic lock situation.

The clutch assemblies, as described above and the method of assembly the same, advantageously require fewer parts than conventional clutch assemblies and do not require the use of clips that are permanently installed in the clutch assembly. In addition, using small diameter holes, one for locking the shear pin/spring assemblies and the other for fluid drainage permits the driving clutch members to have more material and thus be structurally more robust compared to conventional clutch assemblies that employ large openings for inserting the springs.

Many other changes can be made in light of the above detailed description. In general, in the following claims, the terms used should not be construed to limit the invention to the specific embodiments disclosed in the specification and the claims, but should be construed to include all types of differentials, gears, gear systems, actuation systems, differential cases, clutch assemblies for differentials and methods of assembling the same that operate in accordance with the claims. Accordingly, the invention is not limited by the disclosure, but instead its scope is to be determined entirely by the following claims.

What is claimed is:

1. A clutch assembly for a differential system, the clutch system comprising:
   a cross pin;
   a pair of driven clutch members;
   a pair of driving clutch members in toothed engagement with the pair of driven clutch members, the cross pin located between the driving clutch members, each driving clutch member having at least one bore; and
   a shear pin assembly received in the at least one bore, the shear pin assembly having a shear pin with a hollow shear pin body and an end surface, the shear pin assembly further having a spring received within the hollow shear pin body, wherein the end surface of the shear pin body contacts the at least one driving clutch member and an end surface of the spring contacts the other driving clutch member to maintain the driving clutch members in a preloaded configuration based on a desired amount of spring compression force.

2. The clutch assembly of claim 1, wherein the hollow shear pin body is a cylindrical body.

3. The clutch assembly of claim 1, wherein the at least one bore is sized to closely receive the shear pin.

4. The clutch assembly of claim 1, further comprising:
a drainage opening extending from an outer surface of the driving member into the at least one bore.

5. The clutch assembly of claim 1, further comprising:
an annular groove extending around an outer surface of the shear pin body.

6. The clutch assembly of claim 5, wherein the annular groove is alignable with an opening extending radially through at least one of the driving clutch members.

7. The clutch assembly of claim 5, wherein the annular groove is sized to receive a tool configured to hold the shear pin assembly in a first position during assembly of the clutch assembly.

8. A clutch assembly for a differential system, the clutch assembly comprising:
a cross pin;
a pair of driven clutch members;
a pair of driving clutch members in toothed engagement with the pair of driven clutch members, the cross pin located between the driving clutch members, each driving clutch member having at least one bore; and
a shear pin received in the at least one bore, the shear pin having an annular groove extending around an outer surface of the shear pin, the annular groove alignable with an opening extending radially through at least one of the driving clutch members.

9. The clutch assembly of claim 8, wherein the shear pin includes a hollow shear pin body having one closed end and one open end for receiving a spring.

10. The clutch assembly of claim 8, wherein the annular groove is sized to receive a tool configured to hold the shear pin in a first position during assembly of the clutch assembly.

11. The clutch assembly of claim 8, further comprising:
a drainage opening extending from an outer surface of the driving member into the at least one bore.

12. The clutch assembly of claim 8, further comprising:
a spring received within the shear pin.

13. The clutch assembly of claim 12, wherein an end surface of the shear pin contacts the at least one driving clutch member and an end surface of the spring contacts the other driving clutch member to maintain the driving clutch members in a preloaded configuration based on a desired amount of spring compression force.

14. A method of assembling a clutch assembly for a differential system, the method comprising:
urging a shear pin into a bore of a driving clutch member with a desired amount of pressure;
compressing a spring located within a body of the shear pin, the spring being compressed between an end portion of the shear pin and the bore of the driving clutch member;
aligning an annular groove of the shear pin with an opening that extends from an outer surface of the driving clutch member into the bore that receives the shear pin; and
inserting a tool into the opening to engage the annular groove and thus secure the shear pin within the bore.

15. The method of claim 14, wherein urging the shear pin into the bore includes pressing the shear pin into the bore using hand pressure.

16. The method of claim 14, wherein inserting the tool into the opening to engage the annular groove includes inserting a wire.

17. The method of claim 14, wherein inserting the tool into the opening to engage the annular groove includes inserting a pin.

18. The method of claim 14, further comprising:
removing the tool from the opening.

* * * * *